United States Patent [19]
Eminger et al.

[11] 3,837,617
[45] Sept. 24, 1974

[54] GATE VALVE
[75] Inventors: Harry E. Eminger, Valencia; Alan H. Campbell, Pittsburgh, both of Pa.
[73] Assignee: Westinghouse Electric Corporation, Pittsburgh, Pa.
[22] Filed: Apr. 19, 1973
[21] Appl. No.: 352,823

[52] U.S. Cl. .................................. 251/87, 251/327
[51] Int. Cl. ....................... F15k 3/314, F16k 3/316
[58] Field of Search ......... 251/84, 86, 87, 158, 175, 251/193, 326, 327

[56] References Cited
UNITED STATES PATENTS
| 584,291 | 6/1897 | Osgood | 251/86 |
| 1,885,000 | 10/1932 | Muller | 251/86 X |
| 2,735,047 | 2/1956 | Garner et al | 251/86 X |
| 3,610,574 | 10/1971 | Hartman | 251/193 X |
| R27,789 | 10/1973 | Tillman | 251/327 |

FOREIGN PATENTS OR APPLICATIONS
| 578,668 | 6/1958 | Italy | 251/326 |
| 709,220 | 8/1941 | Germany | 251/158 |
| 634,641 | 9/1936 | Germany | 251/158 |
| 621,226 | 11/1935 | Germany | 251/158 |

Primary Examiner—William R. Cline
Assistant Examiner—Gerald A. Michalsky
Attorney, Agent, or Firm—Z. L. Dermer

[57] ABSTRACT

A gate valve is disclosed having an improved operating lifetime. A flexible connection is provided between the valve stem and the valve disc which is substantially free from binding and allows translatory motion of the valve disc. A coordinated guide system utilized with the flexible connection assures full guidance of the disc by the valve seat during initial stages of valve opening. During an intermediately opened position and thereafter, guidance of the disc is accomplished by a closely fitted guide which prevents flow induced vibration and chatter.

12 Claims, 5 Drawing Figures

GATE VALVE

BACKGROUND OF THE INVENTION

1. Field of the Invention

This invention relates to gate valves and more particularly to a method of constructing gate valves in order to increase their operating lifetime.

2. Description of the Prior Art

There are indeed a large variety of the type of valves commonly referred to as gate valves. Within this variety, the valve style which provides one of the more effective methods of sealing against a fluid flowing therethrough is the type of gate valve utilizing a wedge shaped disc. That is, the disc utilized to seal off the flow of fluid has a wedge configuration in a plane perpendicular to the direction of the flow. The wedge shaped disc fits within a similarly shaped opening in the body of the valve which comprises the valve seat. When the disc is firmly in contact with its seat, the wedge configuration results in the generation of a relatively high seating force. It is this high seating force that provides for the very effective fluid seal. A stem, which is connected to the disc and extends to a position outside of the valve body, is typically utilized to impart vertical motion to the disc to open and close the valve.

It will be appreciated by one skilled in the art that a rigid connection between the stem and the disc of a gate valve is neither feasible nor practicable. This is so for a number of reasons. One reason is that a rigid connection will cause a transfer of flow induced forces from the disc to the valve stem. These forces, which include vibratory forces, would then cause rapid deterioration of a seal which is necessary between the stem and its associated opening in the valve body through which the stem extends. Another reason is that a rigid connection between stem and disc would require exacting alignment of the axis of the valve body, the valve stem, the valve disc, and the valve seat with respect to each other. The manufacturing costs associated with such an alignment requirement would be prohibitive. Thus, it has been common practice in the prior art to provide a flexible joint, such as a T-connection, between the valve stem and disc.

The simple T-connection between stem and disc of the prior art has continuously shown itself to be an inexpensive and effective solution for many valve applications. There are some applications however, where the T-connection or its equivalents are not satisfactory. One such application might be where large differential pressures are involved, such as in nuclear reactor systems. A large pressure differential causes the disc to cock relative to the stem resulting in high point loads at the T-connection and therefore high friction loads, which tend to negate the effectiveness of the flexible joint in providing translation of the disc. A cocked disc also causes high point loads on the valve seat during opening of the valve. The high friction associated with these high loads often causes galling of the valve disc or the valve seat thereby substantially reducing the operating lifetime of the valve.

One attempted, however ineffectual, solution of the prior art to the high point loading and friction problem was to utilize a close fitting guide between the valve disc and the valve body to prevent cocking of the disc. In order to retain the aspects of the flexible connection between the stem and the disc however, a relatively large amount of clearance was shown to be necessary between guiding surfaces of the guide and the valve disc. Subsequent cocking of the valve disc because of these relative large clearances again resulted in high point loading thereby rendering the flexible joint ineffective.

SUMMARY OF THE INVENTION

The present invention provides a gate valve with a coordinated guide system in conjunction with a connection between the valve stem and the valve disc which remains flexible under high pressure drop forces; these features result in high sealing efficiency and a maximum alignment of the disc and its seat.

In an exemplary embodiment, this invention utilizes a doubly articulated link between the valve stem and the valve disc of a gate valve. The resulting articulated joint permits the valve disc to translate relative to the valve stem in a direction parallel with the fluid flow. This ability to translate without the accompaniment of high friction forces at the stem to disc connection results in full seating of the wedge shaped disc on its seat in the valve body. Upon the initiation of valve opening, the valve seat acts as a guiding surface until the valve is partially open and the differential pressure is greatly reduced. Guidance of the disc is then transferred to a coordinated guide system which causes the disc to move in a direction perpendicular to the fluid flow and lifts the disc off its slightly angled seat. Upon reaching an open position, the clearance within the coordinated guide system is greatly reduced so that the disc is unable to chatter or flutter during normal flow conditions.

The combined effect of the improvements provided by this invention is to minimize wear on the valve disc and the valve seat by maintaining alignment and thereby reduce wear on the valve sealing surfaces. Also, since the articulated disc connection and the coordinated guide system reduce lateral loads on the stem, the life of the seal between the stem and the valve body is greatly increased.

BRIEF DESCRIPTION OF THE DRAWINGS

Other advantages and a better understanding of the invention will be apparent from the following detailed description taken in consideration with the accompanying drawings in which.

DESCRIPTION OF THE PREFERRED EMBODIMENTS

Figure 2:
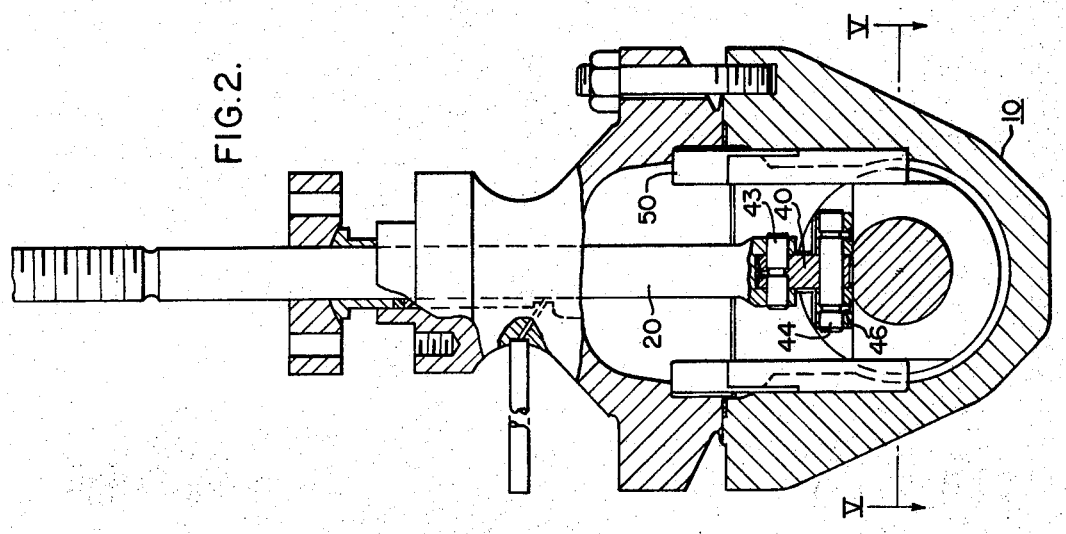
FIG. 2 is a side elevational view of the valve of FIG. 1.

Throughout the description which follows, like reference characters indicate like elements in the various figures of the drawings.

Figure 1:
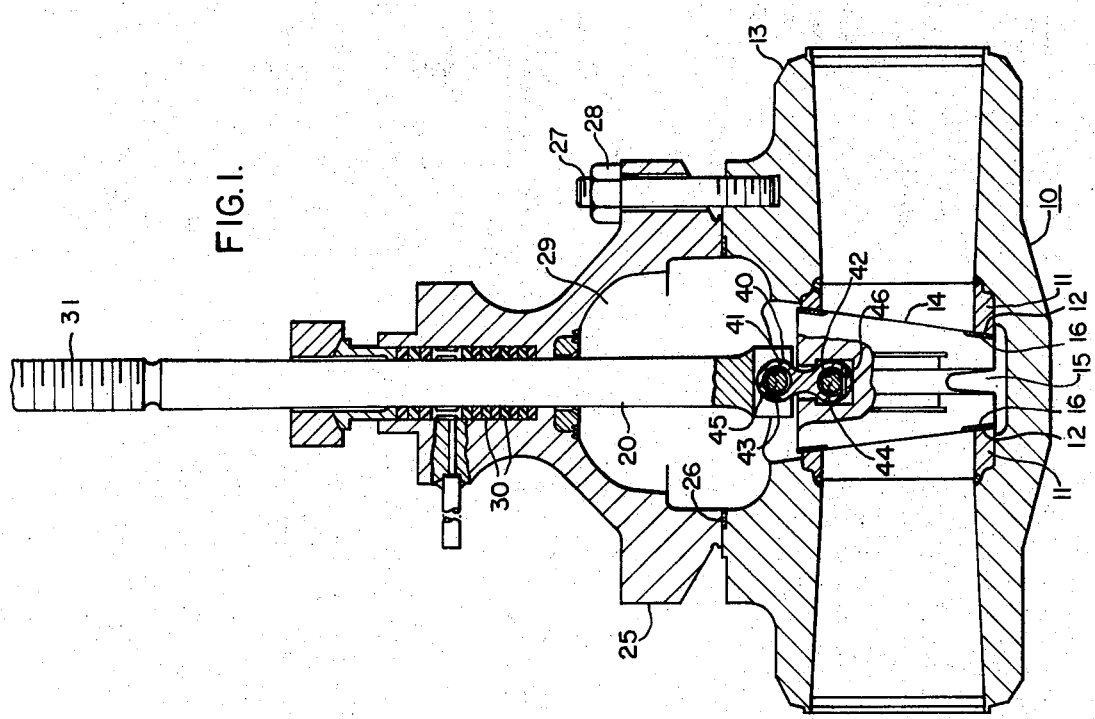
FIG. 1 is an elevational view, in section, of a gate valve utilizing the principles of this invention.

Referring now more particularly to FIG. 1, a gate valve is depicted therein which utilizes the principle of this invention. A valve body 10 has a pair of annular members 11 comprising valve seats, welded to the interior thereof such that a V-shaped or wedge shaped opening exists between seating faces 12 of the valve seats 11. Typically, the seating surfaces 12 are hardened or coated with a hard material in order to prolong the operating life of the valve. Inlet and outlet parts 13 are provided with the valve body 10 to allow for the ingress and egress of fluid flowing through the valve. In the particular example shown, the inlet and outlet ports 13 are prepared in such a fashion as to permit the valve to be welded in place.

As shown in FIGS. 1 and 2, a disc 14 having a wedged cross sectional configuration fits within the similarly shaped opening 15 in the valve body 10. Faces 16 of the disc 14, adjacent surfaces 12 of the valve seats 11, are also hardened to prolong operating lifetime of the valve. A valve stem 20 is connected to disc 14 so that disc 14 may be raised or lowered to open or close the valve, respectively. It is to be observed, that in FIGS. 1 and 2 the disc is in a lowered position, hence the valve is closed.

A valve bonnet 25 is sealingly attached to valve body 10. In the example shown, this is accomplished by a gasket 26 being compressed between respective faces of the valve body and the valve bonnet by studs 27 in conjunction with nuts 28. Sufficient space 29 is provided within bonnet 25 for the disc 14 when the valve is in an open position. As can be seen, valve stem 20 extends external of valve bonnet 25 through an opening in the valve bonnet 25. A conventional means, such as packing 30 which is interposed the valve stem 20 and the opening in bonnet 25, effectuates a seal thereby preserving the pressure maintaining integrity of the valve.

Acme threads 31 or the like are provided at the unattached end of valve stem 20. Threads 31 allow the attachment of a power driven operator nut (not shown) or other suitable drive means to actuate the valve.

Figure 3:
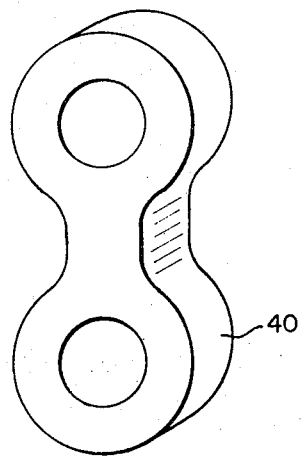
FIG. 3 is an isometric view of one form of a link connecting the valve stem with the valve disc as provided by this invention.

A link 40, independently illustrated in FIG. 3, is utilized to connect valve stem 20 to the valve disc 14. Each end of the link 40 is cylindrically shaped with holes 41 and 42 extending therethrough. One end of link 40 is pivotally connected to valve stem 20 by pin 43. Another pin 45 is pressed into an opening in the cylindrical end of link 40 and fits within a slot provided in the periphery of pin 43. In this way, the various members are firmly interconnected while permitting rotational motion of the cylindrical end of link 40 around pin 43. The other cylindrical end of link 40 is similarly attached to disc 14 by pins 44 and 46. Thus, a disc 14 is pivotally connected to the other cylindrical end of link 40. It is to be observed, that link 40 and pins 43 and 44 permit translation of disc 14 with respect to valve stem 20 in a plane parallel to the direction of flow. It is to be further observed, that the friction associated with this movement has been substantially reduced as compared to the prior art. The operative effects of this doubly articulated connection between valve stem and disc will now be described.

The valve opening sequence begins with the valve being in a closed position as represented in FIGS. 1 and 2. For purposes of this explanation, it is assumed that the gate valve is installed in a line forming part of a flow system and that a relatively high pressure drop exists across the disc 14. Rotation of valve stem nut causes the stem 20 and valve disc 14 to move in a vertically upward direction. Disc 14 becomes uniformly unseated from valve seat 11 because of the geometric relationship between the wedged disc and wedged seat. However, the relatively high pressure drop forced across valve disc 14 causes the disc to translate toward the downstream side of valve seat 11. The combination of the pressure drop force and the doubly pinned link 40 assures that the seating surface of valve disc 14 fully contacts the downstream surface 12 of valve seat 11. Continued rotation of the valve stem nut results in further axial upward motion of valve disc 14 which is now being guided by the downstream surface 12 of valve seat 11. When the bottom of valve disc 14 clears the upper edge of the bottom portion of the valve seat 11, the valve is slightly open causing a large reduction in the differential pressure across the valve disc 14. Hence, there is a corresponding reduction in the seating force between valve disc 14 and the downstream surface 12 of valve seat 11. Since this high seating force and the attendant possibility of galling of the valve seating surfaces gave rise to the fully guided requirement to prolong valve life, the need for full guidance no longer exists at this stage of the valve opening sequence. It is at this time that the coordinated guide system of the valve begins to assume control of further guidance until the valve is fully open.

Figure 4:
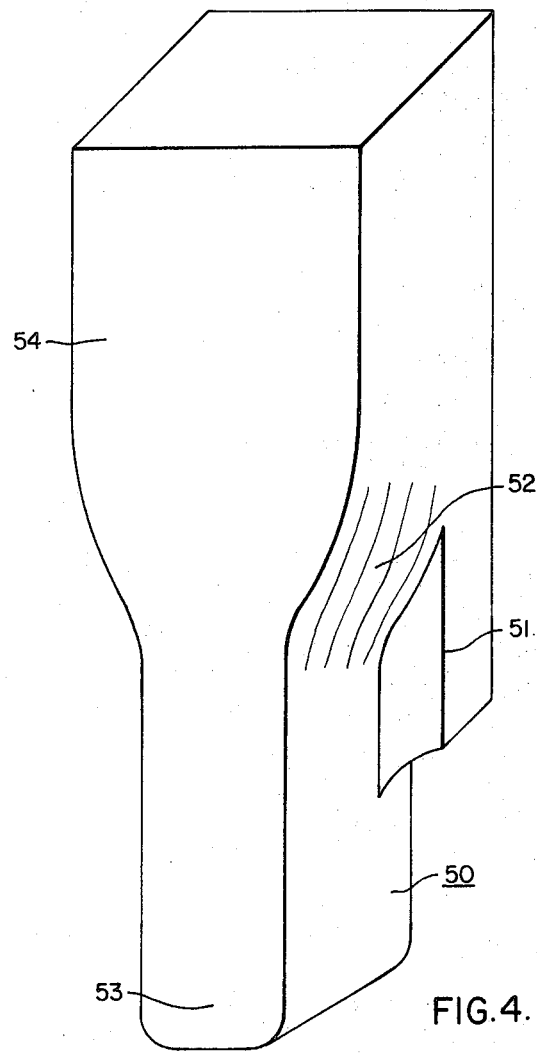
FIG. 4 is an isometric view of one form of a cammed guide as provided by this invention.

Details of the coordinated guide system may be seen by referring to FIGS. 2 and 4. A cammed guide 50 is mechanically attached to valve body 10 by suitable means. In the example shown, a protruding ledge 51 on each side surface of guide 50 fits within a slot in valve body 10. Attachment of valve bonnet 25 to valve body 10 locks the guide 50 into position as shown in FIG. 2. In order to assure smooth guidance of the disc, two guides are used, each being positioned at opposite edges of the disc 14.

As can be seen more clearly in FIG. 4, the cammed guide 50 essentially comprises an elongated substantially rectangular bar. The lower portion 53 of the guide 50 has a smaller width than the upper portion 54, with a smooth transition 52 between the different widths. The smooth transition 52 forms the cammed surface of the guide 50, the function of which will be more fully described hereinafter.

Figure 5:
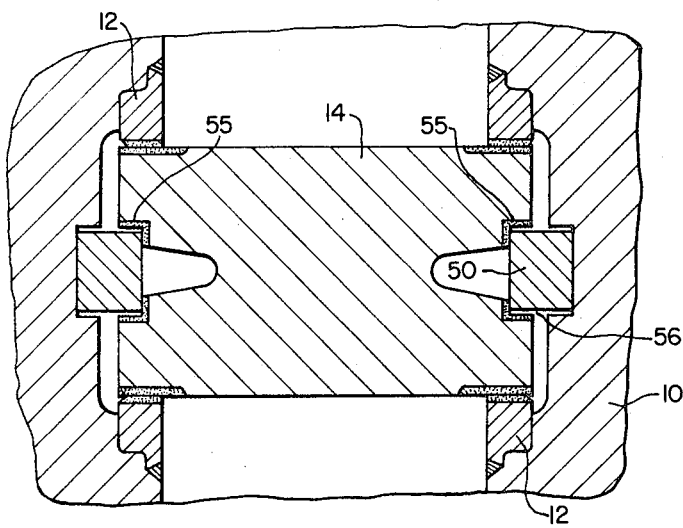
FIG. 5 is a cross-sectional view of the disc and guide taken substantially along the line V—V of FIG. 2.

Referring now to FIG. 5, it is seen that slots 55 are provided opposite each other in the non sealing side surfaces of valve disc 14. The width of each slot 55 is larger than the width of either the upper or lower portion, 54 and 53, respectively of the guide 50. Thus, a relatively large clearance space 56 exists between guide 50 and slot 55 in valve disc 14 when the valve is closed as shown in FIGS. 1 and 5. It will be remembered, that during the initial stages of opening, valve disc 14 is caused to translate to the downstream surface 12 of valve seat 11. Clearance space 56 permits this translation to occur. When the valve is partially open and the pressure drop force is greatly reduced, the upstream portion of clearance 56 is gone and the cammed guide 50 serves to lift the disc 14 from the downstream surface 12 of valve seat 11. This occurs because elimination of the upstream clearance 56 prevents further translation; hence, further rotation of the valve stem nut results in valve disc 14 being vertically lifted. When the valve is more fully opened, the upstream surface of the slot 55 in disc 14 contacts the upstream cammed surface 52 of guide 50 causing valve disc 14 to translate in an upstream direction. Camming of valve disc 14, and hence upstream translation, continues while disc 14 is being raised until the slots in valve disc 14 contact with the wider portion 54 of guide 50. The valve disc 14 is now in an intermediate position and is fully guided by the upper portion 54 of guides 50. The close clearance space 56 which now exists between guides 50 and the slots in disc 14 prevents flutter or chatter of the disc as a result of fluid flowing through the valve, thereby extending the operating life of seal 30.

The operation of the coordinated guide system and the articulated link as provided by this invention during closing of the valve is similar but opposite to the operation described above. It will be appreciated by one skilled in the art that closing the valve against the flow subjects the disc to high fluid flow forces and a resulting differential pressure drop. Therefore, the need for translation of the disc relative to the downstream surface 12 of valve seat 11 in cooperation with the cammed coordinated guide is again necessary for the same reasons explained above.

From the foregoing description, taken in connection with the drawings, it is seen that this invention provides a gate valve having a greatly improved operating lifetime. A flexible joint which is substantially free from binding is provided between the valve stem and the valve disc. The link further provides for movement at each end thereof thereby allowing translatory motion of the valve disc. A coordinated guide system utilized with the articulated joint permits full guidance of the disc by the valve seat during initial stages of valve openings. During intermediate and fully open positions, guidance is transferred to closely fitted guides which prevent valve flutter and chatter during flow conditions.

Since numerous changes may be made in the above described apparatus and the different embodiments of the invention may be made without departing from the spirit and scope thereof, it is intended that all the matter contained in the foregoing description or shown in the accompanying drawings shall be interpreted as illustrative and not in a limited sense.

We claim:

1. A gate valve comprising a valve casing including an inlet and an outlet port, a valve seat located in said valve casing comprising at least one annular member positioned substantially transverse to the axes of said ports, a movable disc disposed within said casing for sealing with said valve seat, said valve disc being translatable in a direction substantially parallel to the axes of said ports, a valve stem connected to said valve disc for moving the disc into and out of sealing relationship with said valve seat, said stem to disc connection comprising at least two joints with each joint being rotatably movable in a plane substantially parallel with the axes of said ports, and guide means for guiding said translation of said disc, said guide means including an elongated member attached to said valve casing and at least one groove in said valve disc, said elongated guide member having a substantially rectangular cross sectional shape with a first width dimension such that when said disc is in substantial sealing with said valve seat said guide member fits loosely within said groove in said disc thereby permitting said disc to translate in said direction parallel with the axes of said ports, said elongated member having a second width dimension such that when said disc is in a position other than in substantial sealing with said valve seat said guide member fits closely within said groove in said disc thereby preventing translation of said disc.

2. A gate valve comprising a valve casing including flow inlet and outlet ports, a valve seat fixedly disposed within said casing, a valve disc operatively associated with said valve seat for opening and closing said valve, a valve stem connected to said disc for imparting motion to said disc in a direction substantially perpendicular to the axis of said ports to open and close said valve, and linkage means pin connected at one end to said valve stem and pin connected at another end to said disc for allowing said disc to translate in a direction transverse to the plane of said valve seat during said motion causing opening of the valve to maintain said disc in a seated position against said valve seat during said opening of the valve.

3. The gate valve of claim 2, wherein said pinned linkage means comprises a link member having at least two joints, each of said joints being rotatably movable in a plane transverse to the plane of said disc whereby said disc is translatable in a direction substantially transverse to the plane of said valve seat.

4. The gate valve of claim 3 wherein said link member is pivotally connected at one end to said disc by a pin member extending through said disc and said link member, and pivotally connected at its other end to said stem by another pin member extending through said stem and said link.

5. The gate valve of claim 3, including guide means connected to said valve casing for guiding the motion of said valve disc during opening and closing of said valve.

6. The gate valve of claim 5, wherein said guide means comprises at least one groove in said disc, and at least one elongated guide member attached to said valve casing, said guide member being dimensioned to fit closely within said groove such that the direction of travel of said disc is guided by said guide member during valve opening and valve closing.

7. The gate valve of claim 6, wherein said elongated guide member has a substantially rectangular cross sectional shape with a first width dimension such that when said disc is in substantial sealing with said valve seat said guide member fits loosely within said groove in said disc thereby permitting said disc translation transverse to the plane of said valve seat, and said elongated member has a second width dimension such that when said valve is substantially open said guide member fits closely within said groove in said disc thereby preventing translation of said disc.

8. The gate valve of claim 2, including means for substantially preventing said disc from moving in a direction transverse to said valve seat when said valve is substantially open.

9. The gate valve of claim 8, wherein said means comprises a guide arrangement which includes at least one groove in said disc, and at least one elongated guide member attached to said valve casing, said guide member being dimensioned to fit within said groove.

10. The gate valve of claim 9, wherein said elongated guide member is substantially rectangular having a first width dimension such that when said disc is in substantial sealing with said valve seat said guide member fits loosely within said groove in said disc thereby permitting said disc translation transverse to the plane of said valve seat, said elongated member having a second width dimension such that when said valve is substantially open, said guide member fits closely within said groove in said disc thereby preventing translation of said disc.

11. The gate valve of claim 10 including a transitional surface between said first and said second width dimensions of said elongated member for lifting said disc off said valve seat when said valve is in a partially opened position.

12. A gate valve comprising a valve casing including flow inlet and flow outlet ports, a valve seat fixedly disposed within said casing having an upstream sealing surface and a downstream sealing surface and an opening therebetween, a unitary valve disc operatively associated with said upstream sealing surface and said downstream sealing surface of said valve seat for opening and closing said valve, said valve disc fitting within said opening, a valve stem connected to said disc for imparting motion to said disc to open and close said valve, and a single link pin connected at one end to said disc and pin connected at another end to said stem, said link being rotatable at each end in a direction substantially perpendicular to the plane of said disc.

* * * * *